Feb. 27, 1968    J. H. MOSTERD    3,370,692
DEVICE FOR ORIENTING EGGS WITH THEIR POINTS
IN A PREDETERMINED DIRECTION
Filed Sept. 14, 1966
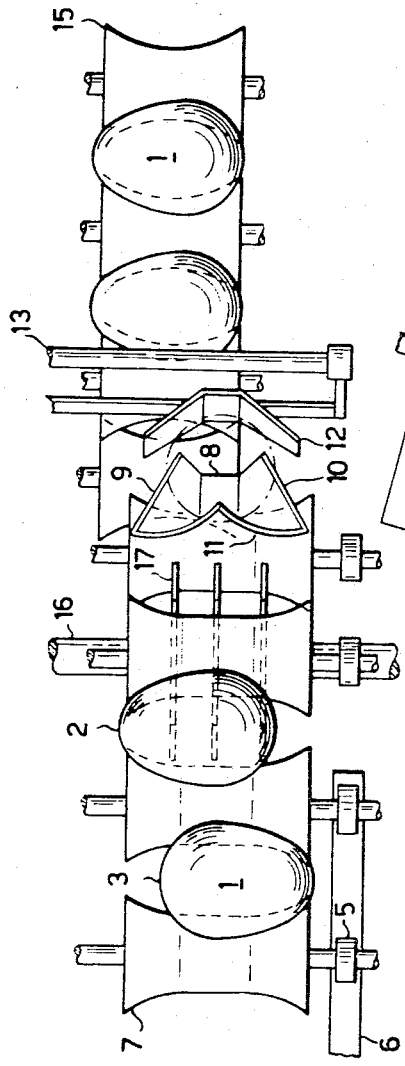
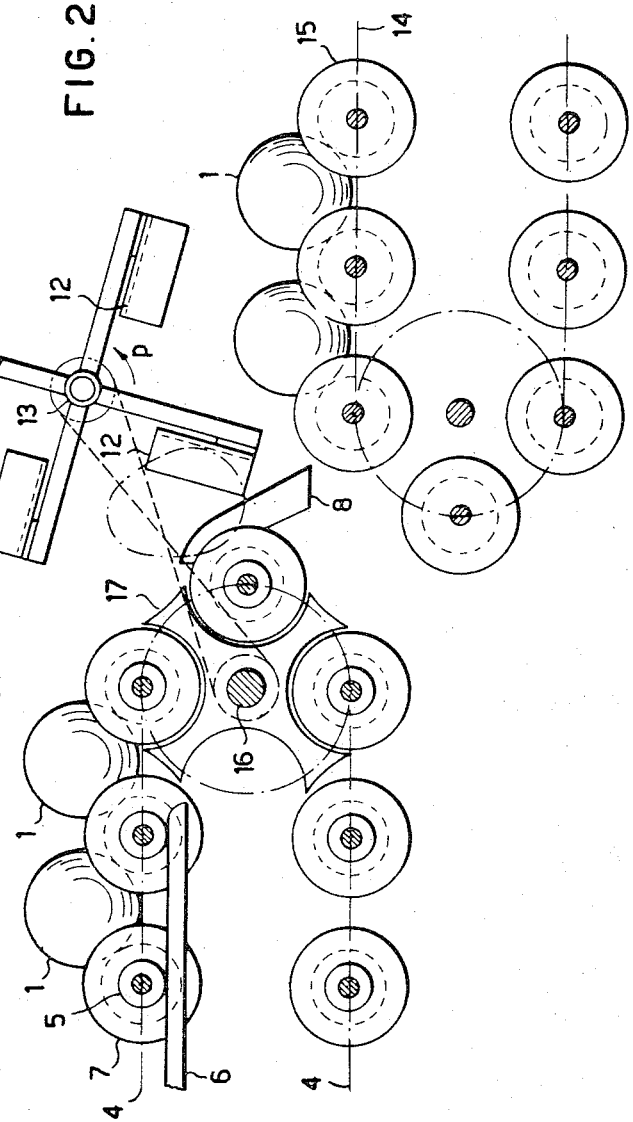
INVENTOR
JACOB HENDRIKUS MOSTERD
BY Gordon A. Huescher
ATTORNEY

United States Patent Office 3,370,692
Patented Feb. 27, 1968

3,370,692
DEVICE FOR ORIENTING EGGS WITH THEIR POINTS IN A PREDETERMINED DIRECTION
Jacob H. Mosterd, Barneveld, Netherlands, assignor to Moba A.G., Basel, Switzerland
Filed Sept. 14, 1966, Ser. No. 579,319
Claims priority, application Netherlands, Sept. 16, 1965, 65—12,101
3 Claims. (Cl. 198—33)

ABSTRACT OF THE DISCLOSURE

Device for orienting eggs in which the points of the eggs are first shifted towards the outsides of rotating concave transport rollers mounted in a chain having a downwardly directed curve, at which curve a guiding member guides the thick ends of the eggs, which are nearest to the region of the rollers having the smallest diameter, to move out first so that all eggs leaving the guide are oriented with their thick ends leading.

---

The invention relates to a device for orienting eggs with their points in a predetermined direction, provided with a roller chain, means for rotating the rollers, which rollers in their center portion have a smaller diameter than in their more outwardly situated portions and a guide-device for orienting the eggs.

With the known devices of this type use is made of the fact, that the driven rollers when rotating shift eggs in the direction of their axis with their points forwardly. The known guide device in such instances is such, that the eggs which are oriented with their points in a certain direction engage the guide device and by means of this guide device are turned, when on the rollers.

An important disadvantage of the known devices is, that a relatively large apparatus width is necessary, which width is considerably greater than the width of the transport tracks of eggs which are necessary in automatic egg handling devices. By reason of this the mounting of a number of such orienting devices one beside the other involves considerable constructive complications in an egg handling device.

The invention aims at providing a device for orienting eggs with their points in one direction, without increasing considerably the width of the transport tracks.

Accordingly with the invention there is provided a device in which the guide device is mounted near a downwardly directed curve of the roller chain which guide device is provided with two downwardly sloping converging guide surfaces (9, 10). When applying the invention consequently always the relatively thick back ends of the eggs will shift forwardly and downwardly and in this way the result is obtained that within the guide device all eggs are oriented with their points in one direction. An important difference with the known device is, that not only the eggs, which had been oriented in one direction, but all eggs perform a tilting movement and that the eggs with their points directed upwardly are successively taken from the roller chain. Consequently the device according to the invention has also in the transport direction of the eggs a small length, which advantage, however, is less important from a constructional viewpoint than its relatively small width.

The guide surfaces are symmetrically placed with respect to the center plane of the rollers and with their fore edges form a downwardly sloping V.

Especially in view of increasing the permissible speed of the device a stop member is mounted some distance above the guide device and spaced from its over some distance in the direction of movement of the roller chain.

A constructively simple embodiment of this stop member is obtained in that the stop member is driven synchronously with the roller chain in the direction of movement of the latter.

When applying the invention as described up till now it is obtained, that in the guide-device all eggs are oriented with their points backwardly. A simple solution for bringing them all with their points oriented towards one side on a further transport member consists in that below the roller chain a further roller chain is mounted having rollers having at their rims a greater diameter than in their center portion, which rollers are displaced in their axial direction with respect to the center of the output side of the guide-device.

For improving the transfer of the eggs from the roller chain unto the guide-device, especially for handling eggs of relatively strongly varying sizes, according to a further elaboration of the invention a pushing member coupled with the roller chain is mounted such that it pushes the eggs just before the guide-device somewhat from the rollers.

The invention is further elucidated with respect to the accompanying drawings, in which:

FIGURE 1 schematically shows a plan view of an embodiment of the invention; and
FIGURE 2 schematically shows an elevation of this embodiment.

On the roller chain 4 eggs 1 are situated, which, because the rollers 7 by means of friction rollers 5 engage a rail 6 are rotated, have been shifted with their points 2 towards the end of the rollers, as is indicated in FIGURE 1. Consequently the thicker back-ends 3 of the eggs are nearer to the said center plane of the rollers 7 than are the egg points 2. At the right hand end of the roller chain a guide-device 8 is mounted having two side planes 9 and 10 which slope downwardly and towards each other in the direction of movement of the eggs, the fore edges 11 of them forming a downwardly sloping V with somewhat outwardly bent legs. Because the eggs are positioned with their thick back ends near the center of the rollers 7, they slide with their back ends downwardly along the guide 8 their point portions 2 engaging the sides 9 or 10 which engagement rotates the eggs, so that their thick back ends always lead and are directed downwardly. At the same time the eggs are somewhat braked by a stop member 12 that, as indicated by arrow P, can rotate around an axis 13, the drive of the axis 13 being synchronous with the drive of the roller chain 4, so that always a stop member 12 (of which in the drawn embodiment four are present mounted on the shaft 13 in a Dutch windmill configuration) can engage an egg 1 when it leaves the roller chain 4. The eggs, which are oriented with their back ends downwardly come upon a further roller chain 14, which (see FIGURE 1) is somewhat displaced with respect to the center of the output side of the guide 8, such that the rim of the rollers 15 of the roller chain 4 engages the eggs 1 outside their axis, by reason of which all eggs turn with their points 2 in FIGURE 1 upwardly and consequently are oriented in the same direction.

On the shaft 16, which also serves the purpose of driving the chain wheels (not shown) of the roller chain 14 a pushing member 17 is provided which consists of three Maltese crosses which lift the eggs somewhat from the rollers 7, before they engage the guide 8.

What I claim is:
1. Device for orienting eggs with their points in a predetermined direction, provided with a roller chain having a downwardly directed curve, means for driving said roller chain, means for rotating the rollers, the rollers having in their center portions a smaller diameter than in their more outwardly situated portions, a guide device mounted near the downwardly directed curve of the roller chain, the fore edges of which guide device slope downwardly from the outside toward the inside, and a stop member movably mounted at some distance above the guide device and spaced from it over some distance in the direction of movement of the roller chain, which stop member is movable along said guide member at some distance from it, and a driving means for driving the stop member synchronously with said roller chain.

2. Device according to claim 1 in which below the guide device a further roller chain is mounted, having rollers which at their rims have a larger diameter than in their center portion, the rollers of the latter chain being displaced in axial direction with respect to the said plane.

3. Device according to claim 1, in which a pushing member is movably mounted and coupled to the roller chain in such manner that it pushes eggs lying on the roller chain somewhat from the rollers shortly before the guide device.

References Cited
UNITED STATES PATENTS

| | | | |
|---|---|---|---|
| 626,284 | 6/1899 | Lyons | 198—183 |
| 2,895,589 | 7/1959 | Rostron | 198—183 |
| 2,911,082 | 11/1959 | Wenzel | 193—43 |
| 3,091,323 | 5/1963 | Niederer | 198—33 |
| 3,101,831 | 8/1963 | Gaddini | 198—33 |

RICHARD E. AEGERTER, *Primary Examiner.*